(12) United States Patent
Getz et al.

(10) Patent No.: US 6,940,235 B2
(45) Date of Patent: Sep. 6, 2005

(54) METHOD AND APPARATUS FOR DRIVING A BRUSHLESS DC MOTOR

(75) Inventors: Robin Laurie Getz, Sherwood, OR (US); David Edward Hanrahan, San Jose, CA (US)

(73) Assignee: Analog Devices, Inc., Norwood, MA (US)

( * ) Notice: Subject to any disclaimer, the term of this patent is extended or adjusted under 35 U.S.C. 154(b) by 82 days.

(21) Appl. No.: 10/142,255

(22) Filed: May 8, 2002

(65) Prior Publication Data

US 2003/0006724 A1 Jan. 9, 2003

Related U.S. Application Data

(60) Provisional application No. 60/290,397, filed on May 10, 2001.

(51) Int. Cl.⁷ .................................................. H02P 5/16
(52) U.S. Cl. ........................ 318/254; 318/138; 318/439; 318/823
(58) Field of Search ................................ 318/254, 138, 318/439, 823, 432

(56) References Cited

U.S. PATENT DOCUMENTS

| | | | | |
|---|---|---|---|---|
| 3,691,438 A | | 9/1972 | Favre | .......................... 318/138 |
| 3,831,073 A | * | 8/1974 | Tanikoshi | .................... 318/254 |
| 4,447,771 A | * | 5/1984 | Whited | ........................ 318/661 |
| 5,193,146 A | * | 3/1993 | Kohno | ......................... 388/811 |
| 5,592,058 A | * | 1/1997 | Archer et al. | ................ 318/254 |
| 5,729,102 A | * | 3/1998 | Gotou et al. | ................. 318/254 |
| 5,850,130 A | * | 12/1998 | Fujisaki et al. | ............. 318/439 |
| 6,049,182 A | * | 4/2000 | Nakatani et al. | ............ 318/432 |
| 6,081,087 A | * | 6/2000 | Iijima et al. | ................. 318/439 |
| 6,091,216 A | * | 7/2000 | Takahashi et al. | ........... 318/254 |
| 6,218,748 B1 | * | 4/2001 | Ushiyama et al. | ........ 310/68 B |
| 6,388,416 B1 | * | 5/2002 | Nakatani et al. | ............ 318/700 |
| 6,392,854 B1 | * | 5/2002 | O'Gorman | .................... 361/31 |

* cited by examiner

*Primary Examiner*—Rita Leykin
(74) *Attorney, Agent, or Firm*—Marger Johnson & McCollom, PC

(57) ABSTRACT

A drive circuit for a brushless DC motor includes a switch constructed and arranged to drive the motor with a pulse signal responsive to a control signal, and control circuitry coupled to the switch and constructed and arranged to generate the control signal responsive to rotor position information from the motor so as to synchronize the pulse signal to the rotor position. A current sensing device can be used to provide the rotor position information to the control circuitry by sensing current flowing through the motor.

12 Claims, 8 Drawing Sheets

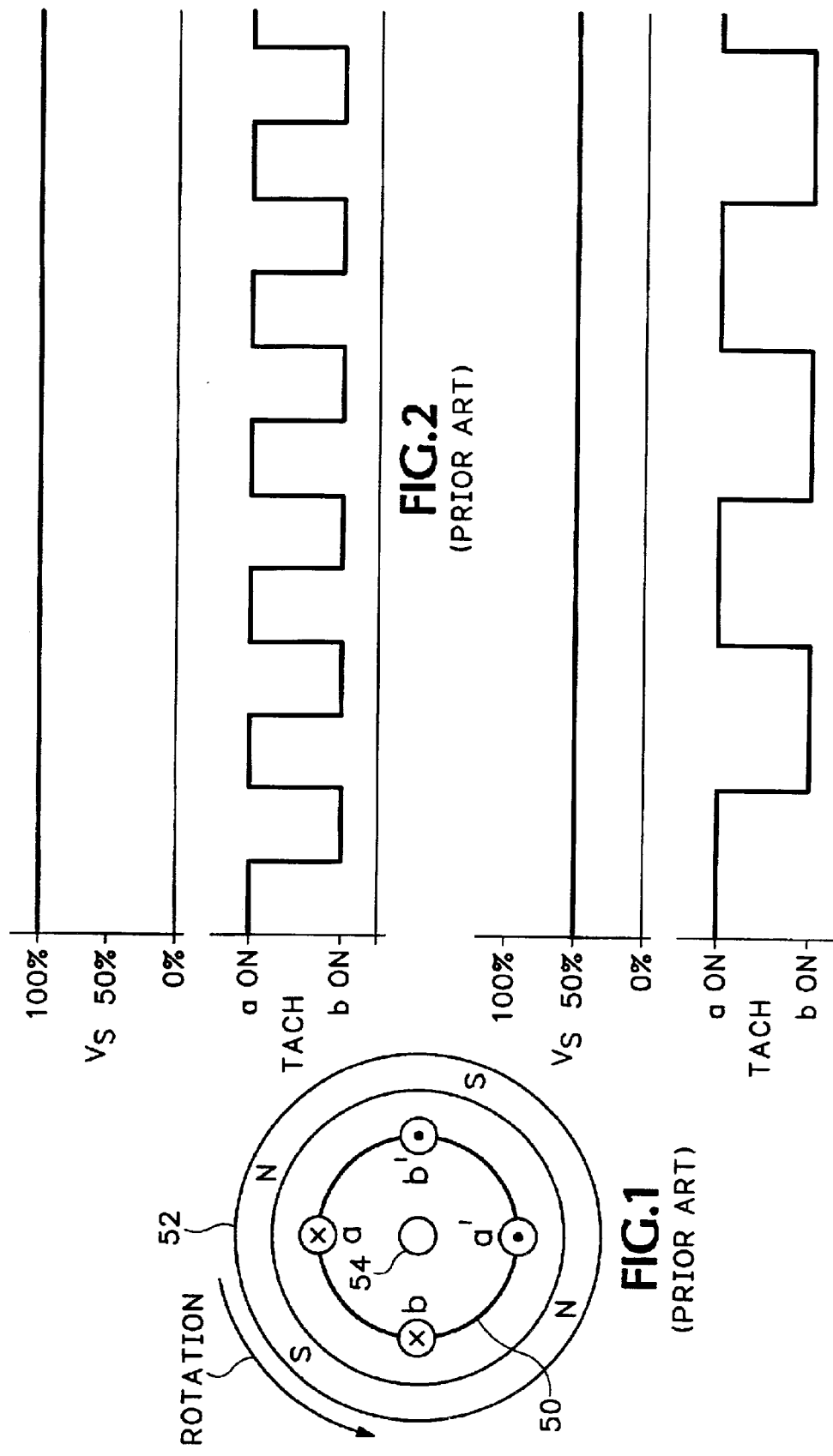

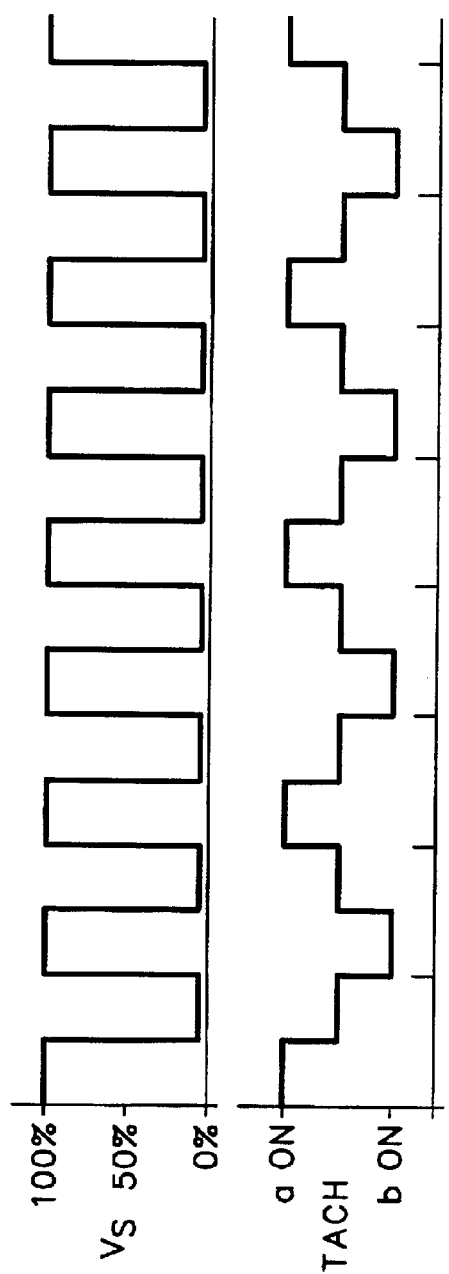
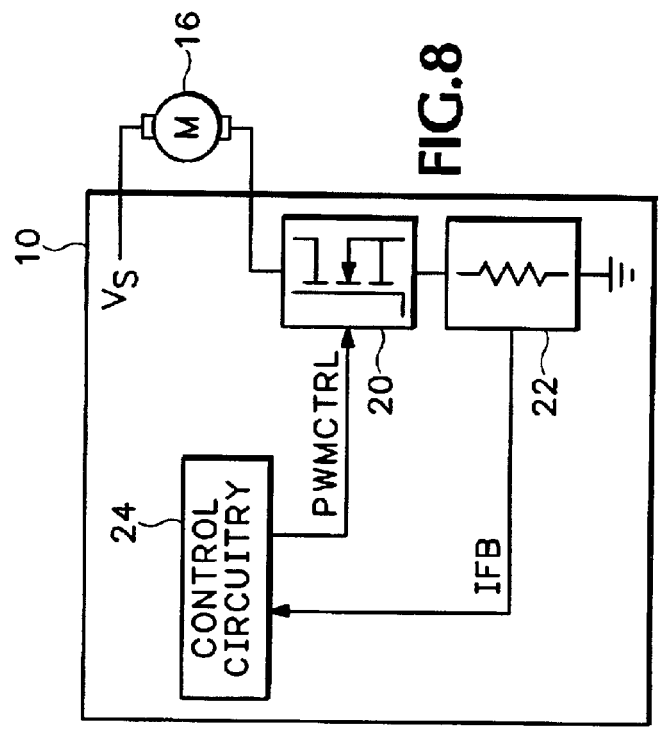
FIG.8
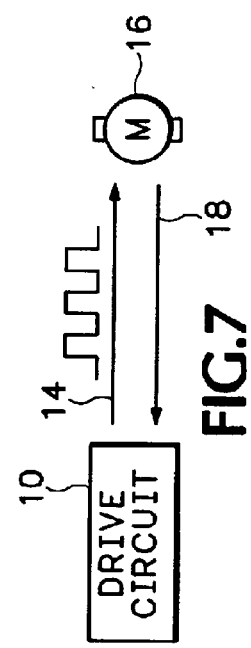
FIG.7
FIG.6

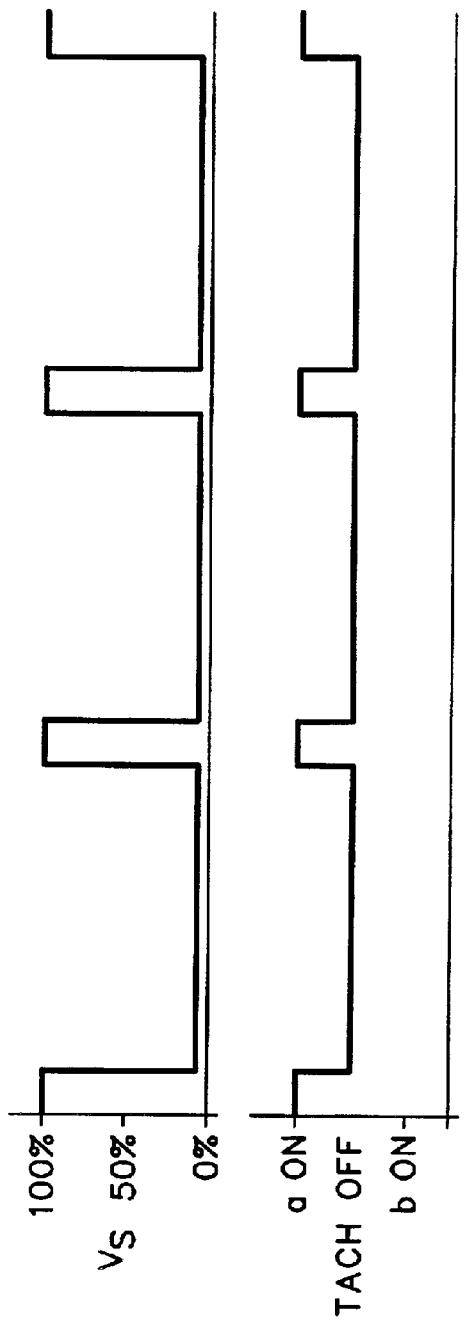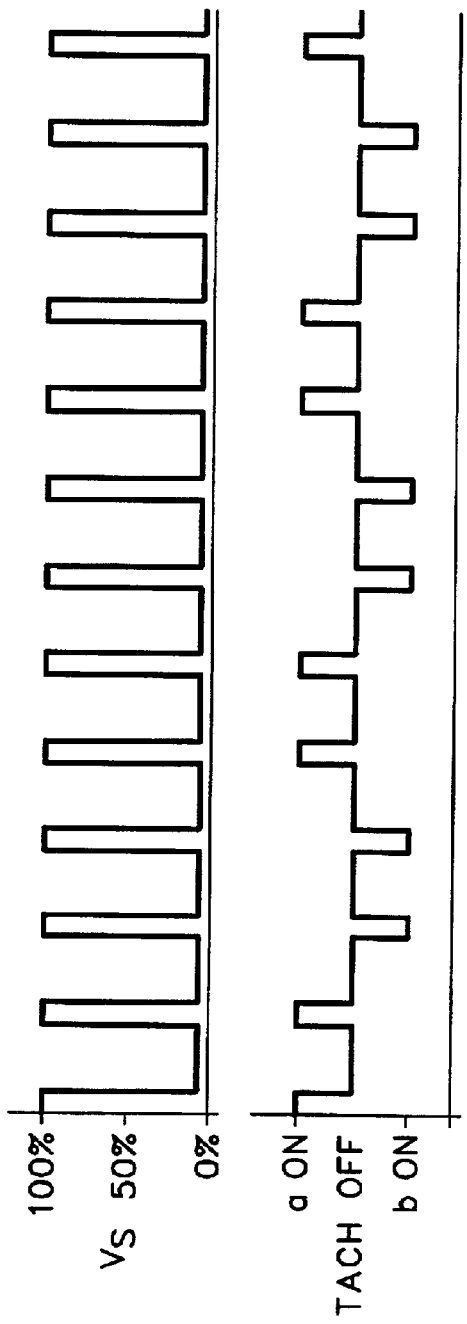

METHOD AND APPARATUS FOR DRIVING A BRUSHLESS DC MOTOR

This application claims priority from U.S. Provisional Application No. 60/290,397 filed May 10, 2001, which is incorporated by reference.

BACKGROUND

Brushless direct current (DC) motors typically include electronic circuitry that energizes and de-energizes electric coils (windings) in the motor in order to make the rotor spin. Brushless DC motors are commonly used to drive cooling fans in electronic devices such as personal computers (PCs). A typical brushless DC motor used in a PC is packaged in such a way that only two terminals are accessible: a positive power supply terminal VS and a ground terminal GND (also referred to as a positive and a negative rail, respectively). A third terminal which provides a signal that indicates the speed of the motor is sometimes accessible as well.

Cooling fans driven by brushless DC motors have traditionally been run at full speed at all times since this is the simplest implementation. In a typical PC, this is accomplished by simply connecting the GND terminal to a power supply ground, and the VS terminal to the computer's +12 Volt or +5 Volt power supply. This is an inefficient scheme, however, since most electronic devices only require maximum cooling power for short periods of time and at random intervals. Running the fan constantly at fall speed wastes energy and generates unnecessary noise.

A recent trend is to run the fan motor at different speeds depending on the cooling demand. One way to accomplish this is to drive the motor with a variable voltage power supply. This is sometimes referred to as linear fan speed control. Linear fan speed control, however, can be difficult and expensive to implement because it requires a variable voltage power supply. There are also problems such as those associated with fact that most 12 Volt fans must initially be driven with at least 6 to 8 Volts to overcome the initial resistance to rotation.

Another solution involves the use of pulse width modulation (PWM). In a PWM scheme, the power supply to the motor is repetitively turned on and off at a fixed frequency but variable duty cycle. When the power supply signal has a relatively low duty cycle, for example 25 percent (that is, the power supply is on 25 percent of the time and off 75 percent of the time), the motor to turns at a relatively slow speed. Increasing the duty cycle causes the motor to spin faster. Full power is achieved by leaving the power supply signal on at all times, i.e., 100 percent duty cycle.

BRIEF DESCRIPTION OF THE DRAWINGS

FIG. 1 is a simplified pictorial drawing of a prior art brushless DC motor.

FIG. 2 is a timing diagram illustrating a prior art technique for driving a brushless DC motor at full speed.

FIG. 3 is a timing diagram illustrating a prior art technique for driving a brushless DC motor at a reduced voltage and speed.

FIGS. 5 and 6 are timing diagrams illustrating an embodiment of a method in accordance with the present invention for driving a brushless DC motor.

FIG. 7 is a block diagram of an embodiment of a brushless DC motor drive circuit in accordance with the present invention.

FIG. 8 is a block diagram of another embodiment of a brushless DC motor drive a circuit in accordance with the present invention.

FIG. 11 is a timing diagram illustrating yet another embodiment of a method in accordance with the present invention for driving a brushless DC motor.

FIG. 12 is a timing diagram illustrating a further embodiment of a method in accordance with the present invention for driving a brushless DC motor.

DETAILED DESCRIPTION

Although prior art PWM schemes are relatively easy and inexpensive to implement, they generates vibrations that can damage the motor and other components in the system. They also generate audible noises such as ticking noises. These problems are believed to be caused by stresses that occur when the pulse width modulated power supply signal is switched at inopportune times.

These stresses can be understood by first considering the operation of a typical brushless DC motor such as the two-phase motor shown in FIG. 1. One set of windings in the stator 50 is designated a–a' (also referred to as phase a), and another set is designated b–b' (also referred to as phase b). Internal electronic circuitry in the motor operates on the assumption that the power supply signal is a constant DC voltage. The circuitry alternately energizes phase a and phase b, depending on the position of the rotor 52, which rides on bearing 54. When one phase is energized, it generates a magnetic field that attracts one pole of the rotor, thereby creating a torque that causes the rotor to spin. When the rotor reaches a certain position, the internal circuitry switches the first phase off and energizes the other phase so as to generate a magnetic field that attracts the other pole of the rotor. To minimize stresses in the motor, the phases are switched when the rotor reaches a minimum torque position. The internal circuitry generally senses the rotor position by using a position sensing device such as a hall-effect sensor that generates a position signal TACH as shown in FIG. 2.

When the speed of a brushless DC motor is reduced by lowering the power supply voltage, the magnetic field created by each phase is weaker, so the rotor spins at a lower speed. The internal circuitry has no problem switching the phases at the proper times because it can always detect the rotor position using the TACH signal as shown in FIG. 3. As discussed above, however, it is expensive and difficult to provide a variable voltage power supply in many electronic systems.

Figure 4:
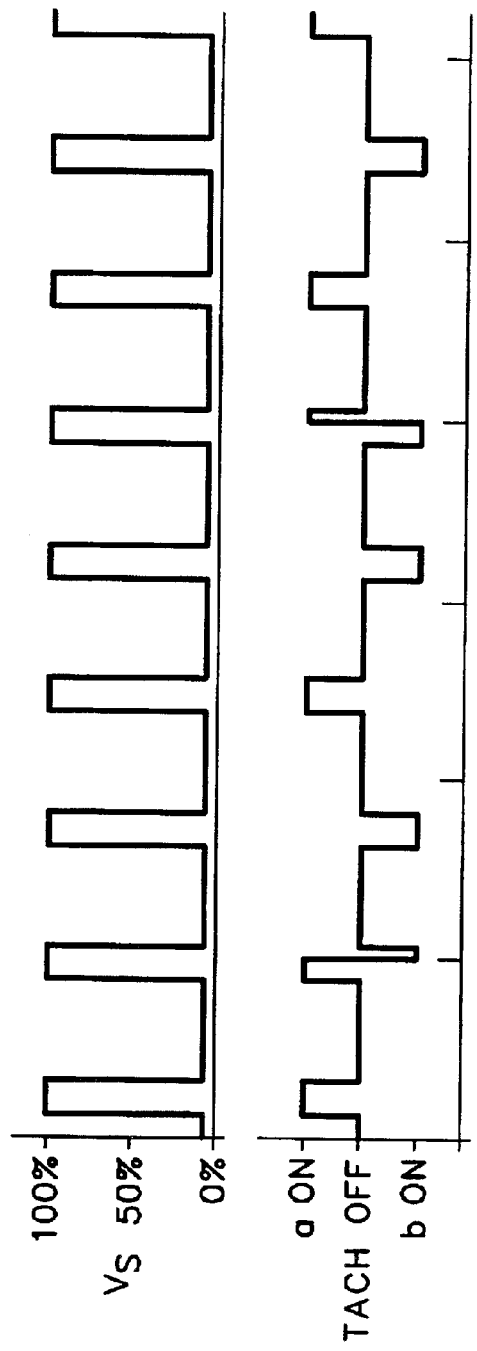
FIG. 4 is a timing diagram illustrating a prior art PWM technique for driving a brushless DC motor at a reduced speed.

In a prior art PWM scheme, a fixed frequency (30 Hz for example) is selected for the PWM signal. FIG. 4 illustrates a PWM power supply signal having a 25 percent duty cycle which typically causes the motor to turn at about half speed. When the PWM signal of FIG. 4 is applied to a brushless DC motor, the internal circuitry energizes the phases as shown by the trace labeled TACH. When the TACH trace shown in FIG. 4 is at "a on" or "b on", phase a or phase b is energized, respectively. When the trace is at the midpoint "off", neither phase is energized because the PWM power supply signal is off during that time. The tick marks at the bottom of FIG. 4 indicate the minimum torque points at which the phases should optimally be switched.

Since the PWM power supply signal is free running, that is, not synchronized to anything, the phases are energized at positions of random torque, and sometime maximum torque, between the rotor and the stator. This can cause several problems. First, bearings in the motor rely on a nominal point contact between a race and a ball. The bearings are easily damaged by high instantaneous torque which causes impact loading between the ball and race. This creates indentations known as Brinell marks in the race. Brinell marks quickly become potential sites for structural damage, thereby reducing the overall reliability of the motor.

Second, energizing a phase at a high torque position produces a torque burst that causes minute flexing of the entire motor structure, thereby resulting in an audible ticking noise. The amount of noise depends on the motor speed, the frequency of the PWM power supply signal, and the duty cycle, all of which change depending on the particular configuration.

Third, if the fixed frequency of the PWM power supply signal happens to be a harmonic of the rotational speed of the motor, the windings are energized at the same place during each revolution. This can cause the motor to shake, thereby causing further damage to both the motor and other apparatus to which the motor is attached.

Figure 5:
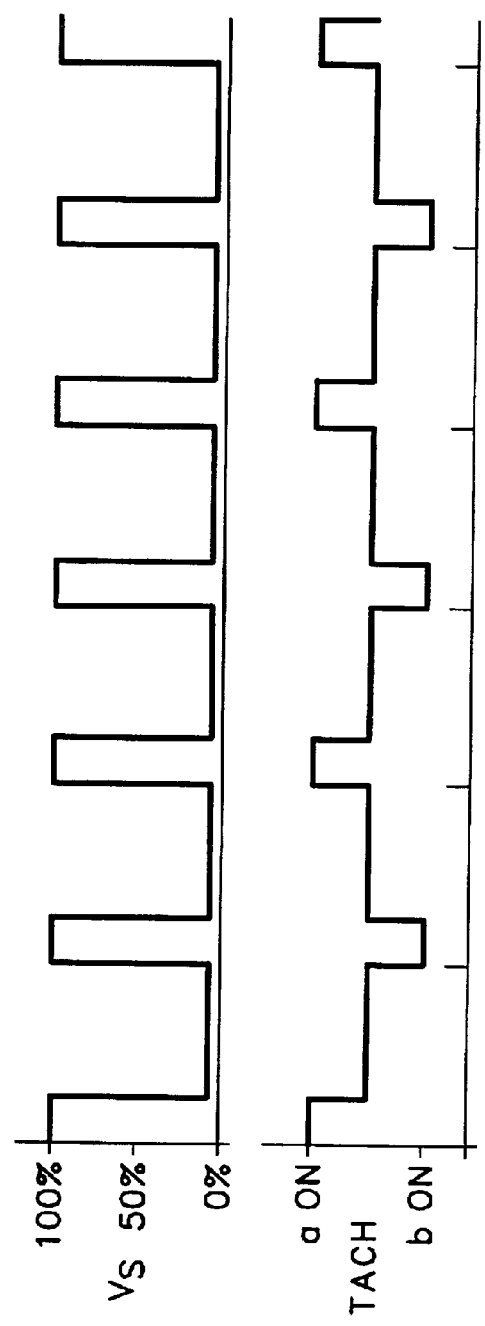

One aspect of the present invention involves synchronizing pulses in a power supply signal with the position of the rotor in a brushless DC motor. FIGS. 5 and 6 illustrate the operation of an embodiment of a method for synchronizing pulses with rotor position in accordance with the present invention. Referring to FIG. 5, the power supply signal VS is a pulse width modulated signal having a train of pulses with a 25 percent duty cycle. Rather than generating the pulses on a free-running basis, however, they are synchronized to the position of the rotor. As shown in FIG. 5, each pulse begins at a minimum torque position. This causes the internal circuitry in the brushless DC motor to energize the windings at times that minimize stress in the motor.

When the motor is energized, instantaneous torque is characterized as follows:

$$T = -\frac{P}{2} L_{sr} i_s i_r \sin\left(\frac{P}{2}\theta_m\right)$$

where:
T=Torque in Newton-meters (a negative sign means that the electro magnetic torque acts in the direction that brings the magnetic fields of the stator and rotor into alignment);
P=number of poles;
$L_{sr}$=the mutual inductance when the magnetic axes of the stator and rotor are aligned;
$i_s$=current in the stator;
$i_r$=current in the rotor;
$\theta_m$=actual mechanical angle between the rotor and stator.
For a given permanent magnet AC motor, P, $L_{sr}$, $i_s$ and $i_r$ are constant. This reduces the equation to $T=K^*\sin(\theta_m)$. If the phases change when the torque is zero, it will not cause any undo torque in the system. Because K is a constant, the only thing that can be controlled is $\theta_m$. The angle $\theta_m$ can be controlled when the motor is energized. In order to set the equation to a minimum, $\theta_m$ must be equal to zero. Since the tachometer signal is also a relative position signal, the fan can be energized with a pulse stream that is synchronous with the tachometer.

As the duty cycle of the power supply signal increases, the rotational speed of the motor increases. Therefore, the frequency of the pulses in the power supply signal is increased accordingly so that the pulses remain synchronized with the rotor position as shown in FIG. 6. The duty cycle of the VS signal in FIG. 6 is about 55 percent (corresponding to about 75 percent speed).

FIG. 7 is a block diagram of an embodiment of a drive circuit for a brushless DC motor in accordance with the present invention. The drive circuit 10 receives input power 12 from any suitable source, typically a fixed voltage power supply. The drive circuit generates a power supply signal 14 having a series of pulses for driving a brushless DC motor 16. The drive circuit receives rotor position information 18 from the motor to enable the drive circuit to synchronize the pulses with the rotor position.

Different techniques can be used to determine the rotor position. If the motor has a position signal that is accessible (from a digital tachometer for example), the drive circuit can read the rotor position by directly monitoring the position signal.

A technique for determining the rotor position in accordance with the present invention is illustrated in FIG. 8. The drive circuit 16 shown in FIG. 8 includes a switch 20 (shown here as a field effect transistor) arranged to turn power to the motor on and off in response to a PWM control signal PWMCTRL from control circuitry 24. A current sensing device 22 (shown here as a current sensing resistor) is arranged in series with the switch to provide a current feedback signal IFB to the control circuitry. Alternatively, the parasitic on resistance of the switch could be used to sense current. By monitoring the current flowing through the motor, the position of the rotor can be determined. Minimum torque positions occur when the mechanical angle between the rotor and stator ($\theta_m$) is zero. At this instant, a commutation current pulse is detected. This technique eliminates the need for a separate position signal from the motor.

Start-up Sequence

In prior art PWM control schemes for brushless DC motors, the power supply signal is usually driven at full power (i.e., not pulsed) for a fixed period of time at start-up, typically in the range of a few milliseconds to a few seconds, to allow the motor to come up to full speed. The power supply signal is then pulse width modulated to operate the motor at the required speed. Since different motors have different start up times, the fixed period of start-up time for prior art PWM motor drives is typically made longer than necessary to assure that it will be long enough for the slowest starting motors. This is inefficient and generates unnecessary noise.

Figure 9:
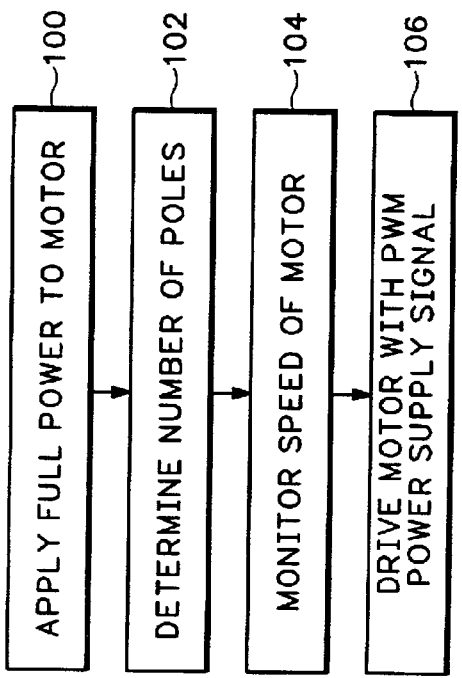
FIG. 9 is a flow diagram illustrating an embodiment of a method in accordance with the present invention for starting a brushless DC motor.

FIG. 9 illustrates an embodiment of a start-up sequence for a PWM control scheme in accordance with the present invention. First, the motor is turned on at full power, i.e., the power supply signal is constantly on (not pulsed), at 100. The number of motor poles is determined at 102. This determination can be skipped if the number of poles is already known. At 104, the speed of the motor is monitored until it reaches a suitable speed. The motor is then driven with a PWM power supply signal at 106.

One method for determining when the motor has reached a suitable speed in accordance with the present invention is to count the number of tachometer edges from a tachometer signal. Since a given motor typically takes a certain number of rotations to come up to speed, this provides a rough approximation of the motor speed.

A more sophisticated technique for determining when the motor has reached a suitable speed in accordance with the present invention is to measure the time between tachometer edges. Since the number of poles is known, the motor speed can be accurately calculated based on the time between tachometer edges. An advantage of this method is that it optimizes the start-up time. That is, the power supply signal is switched from constant-on to PWM operation just as soon as the motor reaches a suitable speed.

As used herein, tachometer edge or pulse refers not only an edge or pulse in a position signal from an actual tachometer, but also more generally to anything that signifies events relating to the position of the rotor. Thus, if the current monitoring scheme described above with reference to FIG. 8 is utilized instead of a Hall-effect tachometer, instants of minimum torque would essentially be considered tachometer edges.

Steady-state Operation

Figure 10:
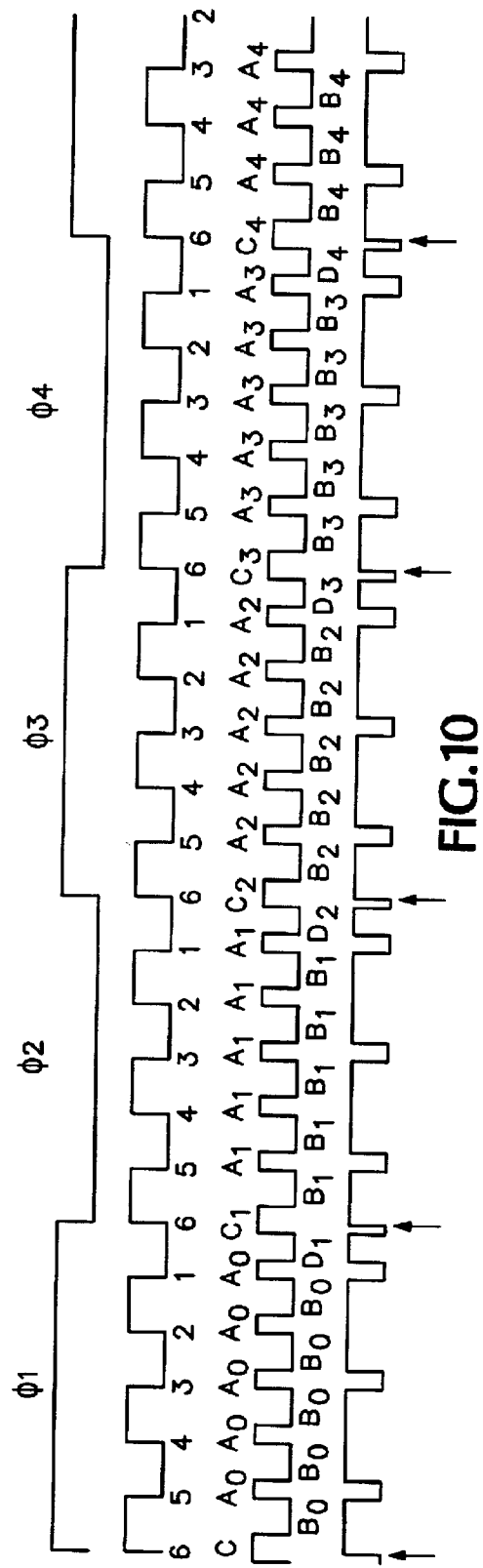
FIG. 10 is a timing diagram illustrating another embodiment of a method in accordance with the present invention for driving a brushless DC motor.

FIG. 10 illustrates another embodiment of a method for driving a brushless DC motor in accordance with the present invention once the motor has started. The top trace in FIG. 10 indicates the physical rotation of the motor where Ø1 indicates the amount of time the motor takes for a first rotation, Ø2 is for the second rotation, etc. The second trace indicates the undisturbed tachometer signal which provides position and velocity information. The third trace illustrates the PWM power supply signal driving the motor. A and C indicate on times, whereas B and D indicate off times. The example shown in FIG. 10 is for a six-pole (three phase) motor (i.e., six "on" times per revolution). The bottom trace illustrates the actual tachometer output signal from the motor, taking into account the fact that the power supply signal to the motor is being switched on and off to control the speed. The actual tachometer output signal is used to determine the amount of time it takes the motor to complete one rotation.

The normal on time $A_1$ and normal off time $B_1$ for the first rotation are calculated as follows:

$$Ø1/P = A_1 + B_1$$

where P is the number of poles in the motor. The duty cycle determines the relationship between A and B:

$$A_1 = DC(A_1 + B_1)$$

$$B_1 = (1-DC)(A_1 + B_1)$$

where DC is the duty cycle (percentage on time).

During the second rotation (Φ2) the PWM power supply signal is turned on during times A1 and off during time B1. At the end of the last "on" time A1, the power supply signal is turned off for a shortened "off" time D2, and then turned on for an indeterminate amount of time until a tachometer edge is detected, and then for an additional amount of time equal to A1. As a result, "on" time C2 is longer than A1. By turning the power supply signal on slightly earlier than needed during the last tachometer cycle, it assures that power to the motor will be switched on before the tachometer edge marking the end of the complete rotation. This assures that the entire PWM power supply signal can be resynchronized at the end of each rotation. The "D" off times should be shorter than the "B" off times by as little as possible while still allowing an adequate margin to accommodate changing rotational speeds. Using D=0.75 B has been found to provide reliable results. The resynchronization can be accomplished with suitable position sensing technique such as the current monitoring scheme described above.

The motor speed is controlled by varying the duty cycle DC. After a complete revolution is completed, the duty cycle is updated, and the on and off times for the next revolution are recalculated.

The methods described herein can be used with brushless DC motors having any number of poles, and not all poles need be utilized. That is, the motor can be driven by using fewer than all of the poles. For example, in the technique described above with respect to FIGS. 5 and 6, the motor can be driven using only phase a and leaving phase b off as shown in FIG. 11. This can be helpful in applications where high resolution is required at the low end of the operating range.

Another method in accordance with the present invention involves the use of multiple pulses on each phase during a single revolution. An example embodiment of such a technique is illustrated in FIG. 12.

Determining Number of Poles

Further aspects of the present invention involve determining the number of poles in a brushless DC motor. The poles in a brushless DC motor are arranged almost symmetrically around the stator. However, the poles are not spaced at exactly even intervals to assure that the motor will begin rotating at start-up regardless of the position in which the rotor stopped previously. This asymmetry causes slight variations in the time between tachometer edges. By measuring the time between tachometer edges and looking for patterns, it is possible to determine the number of poles in the motor.

Figure 13:
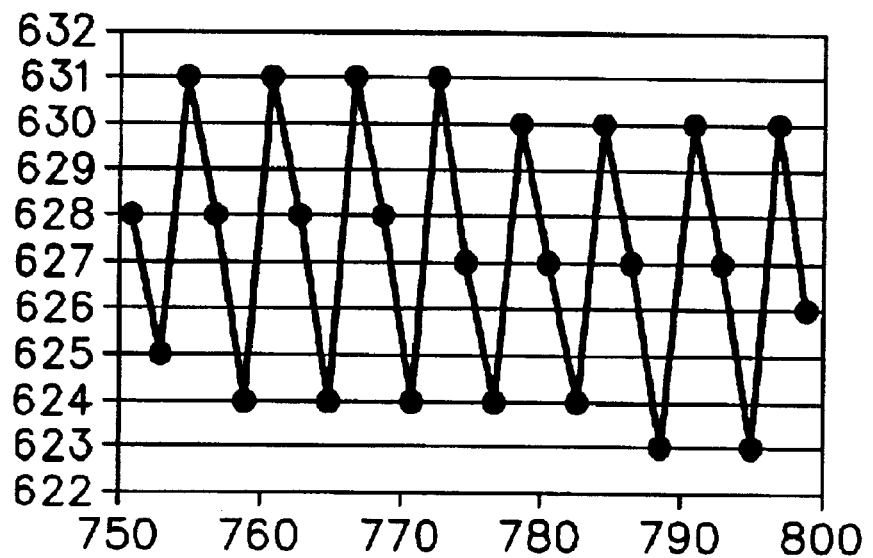
FIGS. 13 and 14 illustrate the time between tachometer pulses for a three-phase brushless DC motor and a two-phase brushless DC motor, respectively.

FIG. 13 illustrates the times between successive tachometer edges for a six pole (three-phase) brushless DC motor running at a steady speed. A three-phase motor provides three tachometer pulses per revolution. The vertical axis is the time between successive pulses in microseconds, and the horizontal axis is a count of the tachometer edges, both positive and negative. Data is only shown for the rising edges. For comparison, FIG. 14 illustrates the times between successive tachometer edges for a four pole (two phase, or two tachometer pulses per revolution) brushless DC motor running at a steady speed.

Figure 14:
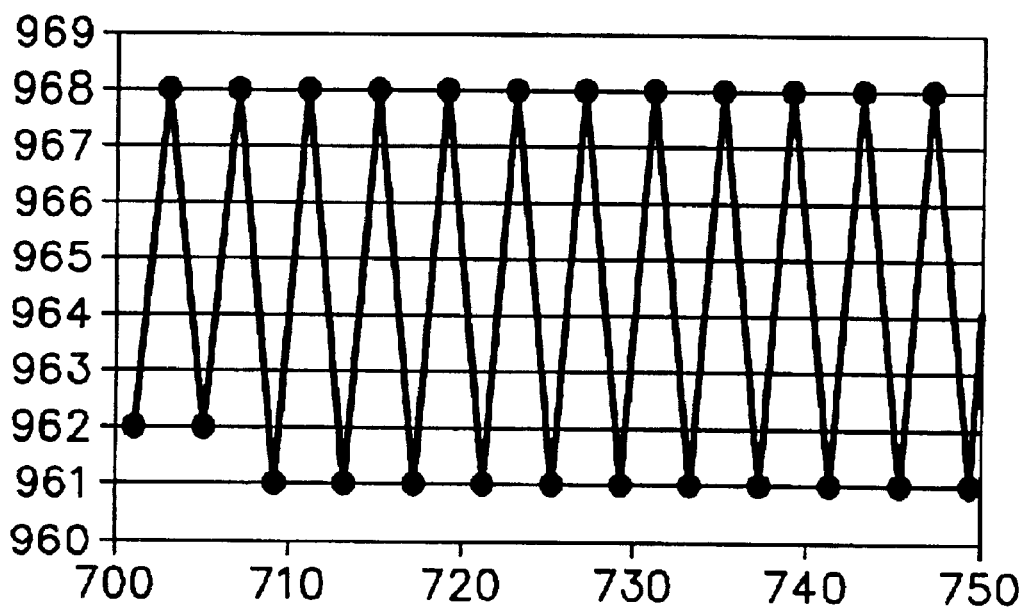

A useful pattern that emerges from FIGS. 13 and 14 is that the number of phases is equal to one plus the number of successive instances in which the time between tachometer pulses is less than the previous time between pulses. Thus, by counting the number of successive times that the time between pulses decreases, the number of poles in the motor can be determined.

Figure 15:
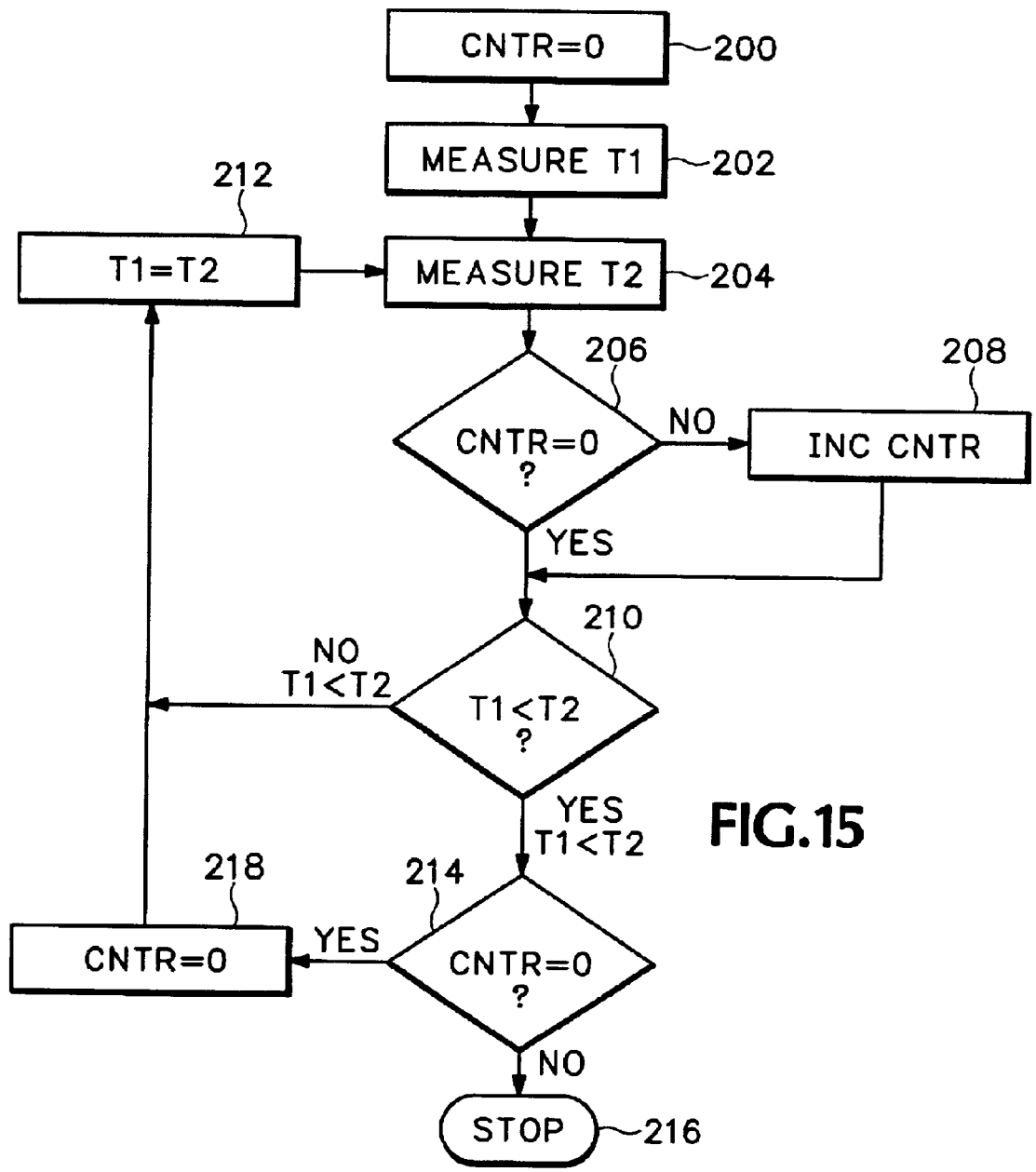
FIG. 15 is a flow diagram illustrating an embodiment of a method in accordance with the present invention for driving a brushless DC motor.

FIG. 15 is a flow diagram illustrating an embodiment of a method for determining the number of poles in a brushless DC motor in accordance with the present invention. Beginning at 200, a counter CNTR is initialized to zero. The time between a first tachometer pulse and a second tachometer pulse is measured at 202 and assigned to the variable T1. The time between the second and a third tachometer pulse is measured at 204 and assigned to the variable T2. At 206 and 208, CNTR is incremented if it is not zero. T2 is then compared to T1 at 210. If T1 is not less than T2, the value of T2 is assigned to T1 at 212, and a new value of T2 (the next time between pulses) is determined at 204.

If T1 is less than T2 at 210, the counter CNTR is tested again at 214. Here, if the counter has a nonzero value, it is the number of phases in the motor, so the method stops at 216. Otherwise, the counter is again set to zero at 218, the value of T2 is assigned to T1 at 212, and a new value of T2 (the next time between pulses) is determined at 204.

To increase reliability, the entire process illustrate in FIG. 15 is preferably repeated a few times to confirm that the correct result has been obtained. The method shown in FIG. 15 can be used even when the motor is still starting up.

In some brushless DC motors, the time between successive pulses has the opposite orientation. That is, the time between successive pulses keeps increasing before falling back down, rather than decreasing before rising back up. Therefore, the method illustrated in FIG. 15 is preferably modified to also count the number of times T1 is successively greater than T2. Alternatively, a separate algorithm that counts the number of times T1 is greater than T2 can be employed when it has been determined that the motor being evaluated has the opposite orientation.

Figure 16:
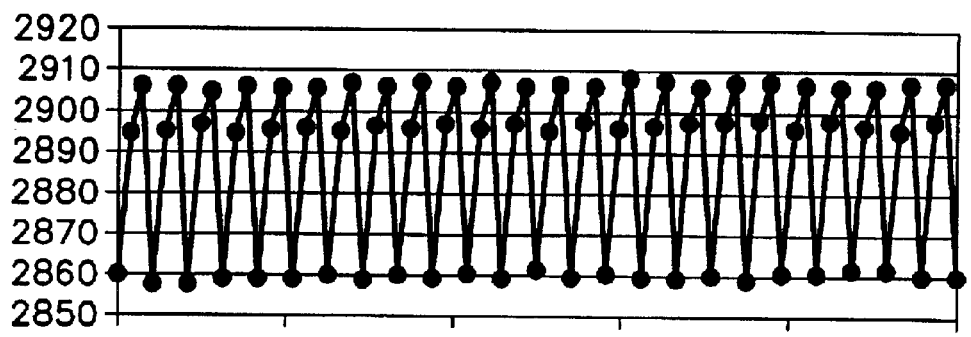
FIGS. 16–19 illustrate the time every pulse, every other pulse, every third pulse, and every fourth pulse, respectively, from a tachometer in a brushless DC motor.
Figure 17:
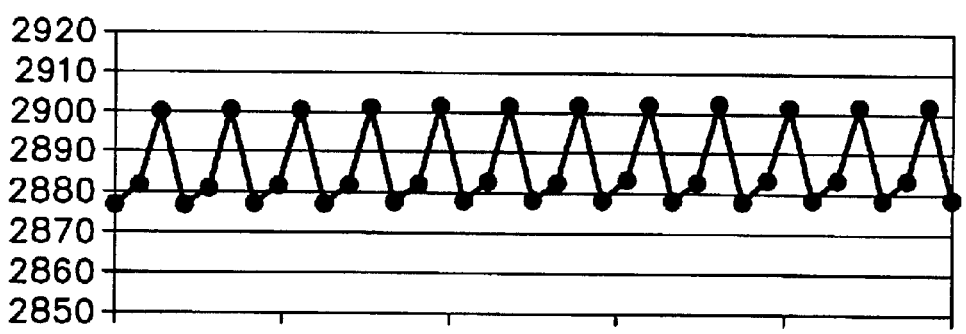
Figure 18:
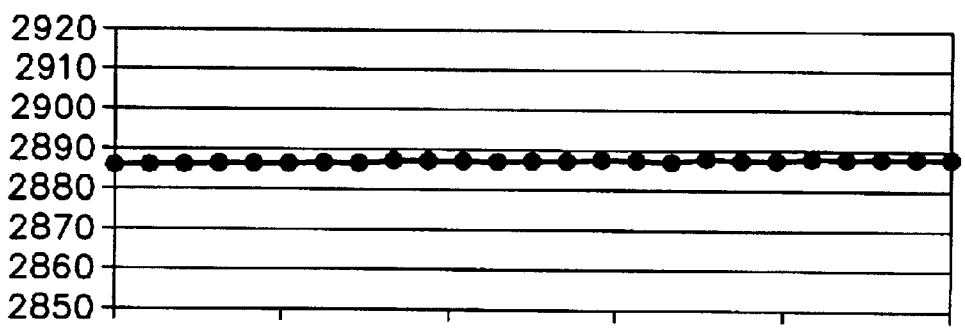
Figure 19:
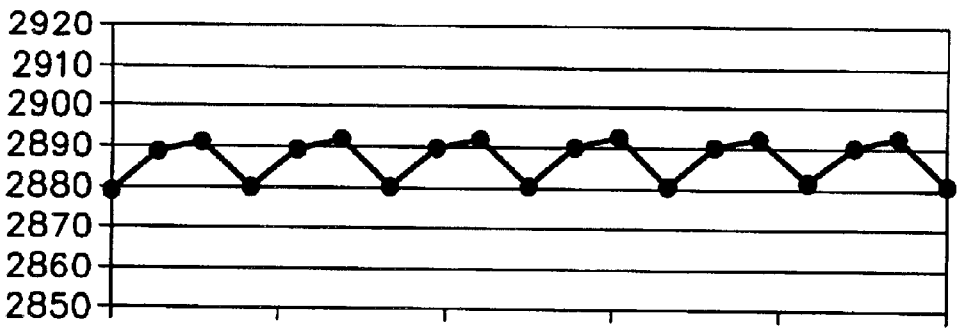

Another embodiment of a method for determining the number of poles in a brushless DC motor in accordance with the present invention is to measure the time between different numbers of pulses, thereby generating different sets of data, and then determining the data set with the lowest amount of ripple. An example embodiment of this method can be illustrated with reference to FIGS. 16–19 which shows data taken for a six pole (three phase) brushless DC motor. The data shown in FIG. 16 is the amount of time between each successive tachometer pulse for the motor. The data shown in FIG. 17 is the amount of time between every other successive tachometer pulse. The data shown in FIGS. 18 and 19 is the amount of time between every third and every fourth tachometer pulse, respectively. By comparing the relative amount of ripple in the data, it is apparent that the motor has three phases because the data taken between every third pulse has the least amount of ripple.

As discussed above, and reiterated here, a tachometer edge or pulse refers not only to an edge or pulse in a position signal from an actual tachometer, but also more generally to anything that signifies the position of the rotor. Thus, the method described above for determining the number of poles in a motor can be implemented not only with an actual tachometer, but also with other methods for determining rotor position such as the current sensing scheme described above with respect to FIG. 8. The methods described herein for determining the number of poles are preferably implemented with a microprocessor or microcontroller located in, for example, control circuitry 24 in FIG. 8.

Synthesizing a Tachometer Signal

A problem associated with pulse width modulating the power supply signal to a brushless DC motor is that the tachometer or other position sensor within the motor typically relies on the motor power supply for operation. Thus, the tachometer signal can be corrupted.

Another aspect of the present invention is a method for synthesizing a tachometer signal. In one embodiment of such a method, the number of poles is determined, the period of one rotation is determined, and then the rotation period is divided by the number of poles to determine a synthesized tachometer period. This can be accomplished by control circuitry that synchronizes the synthesized tachometer signal using any suitable technique to initially determine the rotor position. The synthesized tachometer signal can then be used to synchronize pulses in the power supply signal to the rotor position. Preferably, the synthesized tachometer signal is periodically resynchronized using a position sensing scheme such as a tachometer or current monitoring technique. The methods described herein for synchronizing and/or synthesizing a tachometer signal are preferably implemented with a microprocessor or microcontroller located in, for example, control circuitry 24 in FIG. 8.

Having described and illustrated the principles of the invention in a preferred embodiment thereof, it should be apparent that the invention can be modified in arrangement and detail without departing from such principles. Accordingly, such changes and modifications are considered to fall within the scope of the following claims.

What is claimed is:

1. A method for driving a brushless DC motor having internal circuitry operated from a power supply signal and arranged to energize and de-energize one or more windings in the motor, the method comprising:
    driving the motor with a pulse signal as the power supply signal; and
    synchronizing the pulse signal to the motor position;
    wherein synchronizing the pulse signal comprises determining when the motor is at or near a minimum torque position;
    wherein determining when the motor is at or near a minimum torque position comprises synthesizing a tachometer signal; and
    wherein synthesizing a tachometer signal comprises:
        determining the number of poles in the motor;
        determining the length of time it takes the motor to make one rotation; and
        dividing the length of time by the number of poles, thereby determining a synthesized tachometer signal period.

2. A method according to claim 1 wherein synchronizing the pulse signal comprises using the synthesized tachometer signal to determine when the motor is at or near a minimum torque position.

3. A method for driving a brushless DC motor having internal circuitry operated from a power supply signal and arranged to energize and de-energize one or more windings in the motor, the method comprising:
    driving the motor with a pulse signal as the power supply signal; and
    synchronizing the pulse signal to the motor position;
    wherein synchronizing the pulse signal comprises synchronizing pulses with less than all of the poles of the motor.

4. A method for driving a brushless DC motor having internal circuitry operated from a power supply signal and arranged to energize and de-energize one or more windings in the motor, the method comprising:
    driving the motor with a pulse signal as the power supply signal;
    synchronizing the pulse signal to the motor position; and
    driving the motor with multiple pulses per phase.

5. A method for driving a brushless DC motor having internal circuitry operated from a power supply signal and arranged to energize and de-energize one or more windings in the motor, the method comprising:
    driving the motor with a pulse signal as the power supply signal; and synchronizing the pulse signal to the motor position;
wherein synchronizing the pulse signal to the motor position comprises periodically resynchronizing the pulse signal to the motor position.

6. A method according to claim 5 wherein periodically resynchronizing the pulse signal to the motor position comprises:
   driving the motor with a shortened off time before the end of a complete revolution; and
   driving the motor with an indeterminate on time after the shortened off time.

7. A method for determining the number of poles in a brushless DC motor, the method comprising:
   measuring a plurality of time periods in a signal provided by a position sensing device coupled to the motor; and
   analyzing the plurality of periods to determine a pattern.

8. A method according to claim 7 wherein analyzing the plurality of periods comprises identifying a repetitive pattern in the periods.

9. A method for determining the number of poles in a brushless DC motor, the method comprising:
   measuring a plurality of time periods in a signal provided by a position sensing device coupled to the motor; and
   analyzing the plurality of periods to determine a pattern;
   wherein analyzing the plurality of periods comprises:
      comparing each period to the next successive period; and
      determining how many times a period is less than the next successive period.

10. A method for determining the number of poles in a brushless DC motor, the method comprising:
    measuring a plurality of time periods in a signal provided by a position sensing device coupled to the motor; and
    analyzing the plurality of periods to determine a pattern;
    wherein analyzing the plurality of periods comprises:
       repetitively measuring a first number of successive periods, thereby generating a first group of data points having a first amount of ripple;
       repetitively measuring a second number of successive periods, thereby generating a second group of data points having a second amount of ripple; and
       comparing the first and second amounts of ripple.

11. A method according to claim 10 wherein analyzing the plurality of periods further comprises:
    repetitively measuring a third number of successive periods, thereby generating a third group of data points having a third amount of ripple; and
    comparing the third amount of ripple to the first and second amounts of ripple.

12. A drive circuit for a brushless DC motor having internal circuitry operated from a power supply signal and arranged to energize and de-energize one or more windings in the motor, the drive circuit comprising:
    a switch constructed and arranged to drive the motor with a pulse signal as the power supply signal responsive to a control signal;
    a position sensing device coupled to the motor; and
    control circuitry coupled to the switch and position sensing device, and constructed and arranged to measure a plurality of time periods from the position sensing device and analyze the plurality of periods to determine a pattern.

* * * * *

UNITED STATES PATENT AND TRADEMARK OFFICE
CERTIFICATE OF CORRECTION

| | | |
|---|---|---|
| PATENT NO. | : 6,940,235 B2 | Page 1 of 1 |
| APPLICATION NO. | : 10/142255 | |
| DATED | : September 6, 2005 | |
| INVENTOR(S) | : Getz et al. | |

It is certified that error appears in the above-identified patent and that said Letters Patent is hereby corrected as shown below:

At column 1, line 28, please replace "fall speed" with --full speed--

Signed and Sealed this

Nineteenth Day of December, 2006

JON W. DUDAS
*Director of the United States Patent and Trademark Office*